(12) United States Patent
Kang et al.

(10) Patent No.: US 8,989,771 B2
(45) Date of Patent: Mar. 24, 2015

(54) SPACE RECOGNITION METHOD AND SYSTEM BASED ON ENVIRONMENT INFORMATION

(75) Inventors: Sang Seung Kang, Daejeon (KR); Min Su Jang, Daejeon (KR); Jae Hong Kim, Daejeon (KR); Joo Chan Sohn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 143 days.

(21) Appl. No.: 13/597,843

(22) Filed: Aug. 29, 2012

(65) Prior Publication Data
US 2013/0079030 A1 Mar. 28, 2013

(30) Foreign Application Priority Data

Sep. 27, 2011 (KR) .................. 10-2011-0097364

(51) Int. Cl.
*H04W 64/00* (2009.01)
*G01S 5/00* (2006.01)
*G01S 5/02* (2010.01)

(52) U.S. Cl.
CPC ............ *G01S 5/0036* (2013.01); *G01S 5/0252* (2013.01); *G01S 5/0263* (2013.01)
USPC ..................... 455/456.1; 455/436; 455/456.2; 455/456.3; 455/444

(58) Field of Classification Search
CPC ... G01S 5/0036; G01S 5/0252; G01S 5/0263; H04W 24/00
USPC ................. 455/456.1, 7, 404.2, 412.1–412.2, 455/420–422.1, 436, 456.2, 456.3, 457, 455/550.1
See application file for complete search history.

(56) References Cited

U.S. PATENT DOCUMENTS

| 8,639,640 B1* | 1/2014 | Kadous .......................... 706/12 |
| 2009/0210092 A1 | 8/2009 | Park et al. |
| 2011/0026833 A1 | 2/2011 | Sugino et al. |

OTHER PUBLICATIONS

Satoh, Ichiro, "Location-based services in ubiquitous computing environments," International Journal on Digital Libraries, vol. 6(1):280-291, DOI 10.1007/s00799-006-0006-1 (2006).

* cited by examiner

*Primary Examiner* — Babar Sarwar
(74) *Attorney, Agent, or Firm* — Nelson Mullins Riley & Scarborough LLP; Anthony A. Laurentano, Esq.; Dipti Ramnarain, Esq.

(57) ABSTRACT

A space recognition system obtains available RSSI (Received Signal Strength Indicator) information for a plurality of fixing devices in the vicinity of a user device in the wireless sensor network environment, collects environment information in a space where the user device is located, and collects environment information in a plurality of spaces in which the fixing devices are respectively located. The system combines the RSSI information and the environment information and performs a recognition function on the combined environment information to recognize the space in which a user having the user device is located.

16 Claims, 6 Drawing Sheets

SPACE RECOGNITION METHOD AND SYSTEM BASED ON ENVIRONMENT INFORMATION

RELATED APPLICATION(S)

This application claims the benefit of Korean Patent Application No. 10-2011-0097364, filed on Sep. 27, 2011, which is hereby incorporated by reference as if fully set forth herein.

FIELD OF THE INVENTION

The present invention relates to space recognition technology, and more particularly, a method and a system, which recognize a space in which a user is located on the basis of environment information in an indoor environment including a wireless sensor network.

BACKGROUND OF THE INVENTION

Ubiquitous denotes an environment in which a user can access an information communication network and use an information communication service at any time irrespective of time and place, and is attracting much attention as a next-generation paradigm of Information Technology (IT). Also, position-based technology that automatically recognizes the position of an object and provides a service suitable for the position and contexts by using the ubiquitous environment anywhere at any time becomes increasingly more important.

To provide the position-based service, the positions of user terminals are generally detected using Global Positioning System (GPS) information. However, since GPS radio wave cannot be received inside buildings, various researches are being conducted on alternative technology. Even to efficiently provide a robot service to users in an indoor space, it is important to overcome the limitation.

In the related art, proposed have been a method that recognizes a position of an object by using artificial marks disposed at an indoor ceiling, and an environment recognition method that recognizes marks using an image device to estimate a position of an object. However, the position recognition method based on the artificial mark needs to densely attach a plurality of artificial marks to a ceiling and requires a component in the robot that continuously interacts with the artificial marks on the ceiling, and thus, it is difficult to apply the position recognition method to a general-purpose mobile device.

In the environment recognition method that recognizes a mark to estimate a position based on an image device, there is a technical limitation in processing an image, and moreover, it is difficult to recognize a space having a plurality of similar sections as in public buildings.

Moreover, there is a method that estimates a position by using a Received Signal Strength Indicator (RSSI) which is an index value of a radio wave signal strength, based on a sensor network. However, even in such a method, it is sometimes difficult to steadily secure an RSSI value, and a drawback is caused when communication with a fixing device is affected by the direction or motion of a user or there is a factor that affects radio wave to largely vary an RSSI value.

Accordingly, it is required to develop a method for reducing or overcoming the limitations so as to efficiently recognize a space where a user is located in an indoor environment, but any method for overcoming the limitations has not been proposed to date.

SUMMARY OF THE INVENTION

In view of the above, the present invention provides a space recognition method, and system, which recognize a space in which a user is located, on the basis of environment information in an indoor environment having a wireless sensor network.

Further, the present invention provides a space recognition method, and system, which accurately detect and recognize a space in which a user is located by combining an available RSSI for a wireless sensor network and environment information that has been collected by a plurality of environment sensors in the space.

In accordance with a first aspect of the present invention, there is provided a method of recognizing a space in which a user having a user device is located in an indoor environment having a wireless sensor network, the method including: obtaining available RSSI (Received Signal Strength Indicator) information for a plurality of fixing devices in the vicinity of the user device in the wireless sensor network environment; collecting environment information in the space; collecting environment information in a plurality of spaces in which the fixing devices are respectively located; combining the RSSI information and the environment information collected in the space and the environment information collected from the fixing devices; and performing a recognition function on the combined environment information to recognize the space in which the user is located.

Preferably, the collecting environment information in the space includes obtaining environment data including at least one of a temperature, humidity, intensity of illumination, and noise in the space.

Preferably, the collecting environment information in a plurality of spaces in which the fixing devices are respectively located includes: obtaining, by the neighbor fixing devices, environment data in the respective spaces in which the neighbor fixing devices are located; extracting, by the neighbor fixing devices, feature information from the obtained environment data; generating, by the neighbor fixing devices, environment pattern information on the basis of the extracted feature information; and transmitting, by the neighbor fixing devices, the generated pattern information to the user device.

Preferably, the collecting environment information in the space includes: extracting feature information from the collected environment information; and generating environment pattern information on the basis of the extracted feature information.

Preferably, the obtaining available RSSI information for a plurality of fixing devices in the vicinity of the user device includes: extracting feature information from the obtained RSSI information; and generating pattern information on the RSSI information on the basis of the extracted feature information.

Preferably, the method further includes determining a predetermined number of candidate fixing devices from among the plurality of neighbor fixing devices from which the RSSI information has been obtained.

Preferably, the combining the RSSI information and the environment information includes: combining the environment pattern information and the RSSI pattern information collected from the candidate fixing devices; and the performing a recognition function on the combined environment information includes: performing a recognition function on the combined pattern information; selecting one of the fixing devices having an highest result value; and determining a space, in which the selected fixing device is located, as the space in which the user is located.

Preferably, the method further includes: collecting motion sensing data in the space in which the user is located; and generating at least one of a motion, posture, and direction of the user device on the basis of the motion sensing data.

Preferably, the method further includes: determining whether the motion information is within a predetermined range; performing said collecting the environment information and said obtaining the RSSI information when the motion information is below the predetermined range; and maintaining information on a previously recognized space when the motion information exceeds the predetermined range.

In accordance with a second aspect of the present invention, there is provided a user device for recognizing a space where the user device is located, including: a wireless communication unit configured to obtain RSSI (Received Signal Strength Indicator) information for a plurality of fixing devices in the vicinity of the user device, and receive environment information obtained from the neighbor fixing devices; an environment sensor unit configured to collect environment information in the space; and a processing unit configured to perform a recognition function on the RSSI information and environment information to recognize position information on the space.

Preferably, the environment sensor unit obtains environment data including at least one of a temperature, humidity, intensity of illumination, and noise in the space.

Preferably, the wireless communication unit is configured to obtain the environment data from the environment sensor unit, extract feature information from the obtained environment data, generate pattern information on environment information on the basis of the extracted feature information, and transmit the generated pattern information to the user device.

Preferably, the processing unit is further configured to extract feature information from the collected environment information, and generate pattern information on environment information on the basis of the extracted feature information.

Preferably, the processing unit is further configured to extract feature information from the obtained RSSI information, and generate pattern information on the RSSIs on the basis of the extracted feature information.

Preferably, the processing unit is further configured to determine a predetermined number of candidate fixing devices from among the neighbor fixing devices from which the RSSI information has been obtained.

Preferably, the processing unit is further configured to combine environment pattern information and RSSI pattern information obtained from the candidate fixing devices, perform a recognition function on the combined pattern information, select one of the fixing devices having an highest result value, and determine a space, in which the selected fixing device is located, as the space in which the user is located.

Preferably, the system further includes a motion sensor unit, the motion sensor unit includes at least one inertia sensor configured to collect motion sensing data in the space in which the user is located, and extract motion information including at least one of a motion, posture, and direction of the user device on the basis of the motion sensing data.

Preferably, the processing unit is further configured to: determine whether the motion information is within a predetermined range; perform collecting the environment information and obtaining the RSSI information when the motion information is below the predetermined range; and maintain information on a previously recognized space when the motion information exceeds the predetermined range.

In accordance with a third aspect of the present invention, there is provided a system for recognizing a space in which a user is located, the system including: one or more relay fixing devices, wherein each relay fixing devices is configured to obtain environment information in a fixed space in which the relay fixing devices is installed; a base fixing device configured to perform wireless communication with the relay fixing devices to receive the environment information from the relay fixing devices; and a user device belong to the user, wherein the user device is configured to perform wireless communication with the relay and base fixing devices, collect the environment information from the relay and base fixing devices, checking RSSI information of the relay fixing devices and base fixing device to determine one or more candidate fixing devices, collect environment information from the candidate fixing devices, and perform a recognition function on the environment information and the RSSI information to recognize the space in which a user is located.

Preferably, the base fixing device is further configured to store the environment information from the relay fixing device, and transmit the environment information to the user device in response to a request of the user device; and the base fixing device is further configured to combine the environment information from the relay fixing device and the RSSI information from the user device and perform a recognition function on the combined information to determine a space, in which a fixing device having an highest result value is located, as an estimated space in which the user is located.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings so that they can be readily implemented by those skilled in the art.

Figure 1:
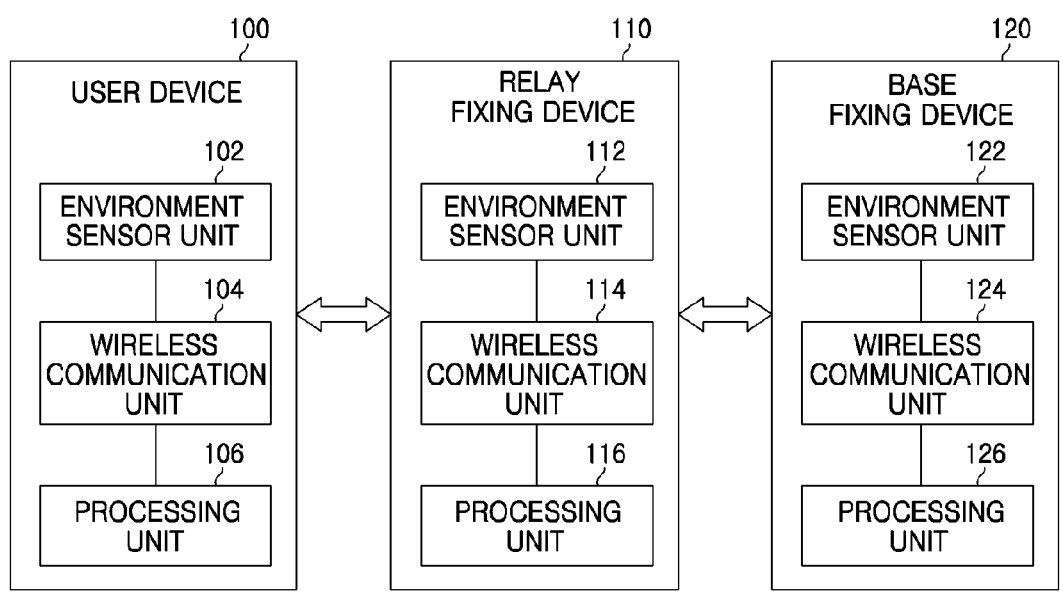
FIG. 1 schematically illustrates a block diagram of a space recognition system based on environment information in an indoor environment in accordance with an embodiment of the present invention.

FIG. 1 schematically illustrates a block diagram of a space recognition system based on environment information in an indoor environment in accordance with an embodiment of the present invention.

Referring to FIG. 1, the space recognition system based on environment information includes: a user device 100 that a user wears or carries for determining a space where the user is located; a relay fixing device 110 that is installed in a fixed space, collects environment information on the fixed space, and performs wireless communication; and a base fixing device 120 that is installed in a fixed space, collects environment information on the fixed space and performs wireless communication. The base fixing device 120 may operates in connection with a server.

Specifically, the user device 100 is a computing device for transmitting and receiving various data and information in operational connection with at least one relay fixing device 110 or base fixing device 120. For example, the user device 100 includes various types of terminal devices such as a wrist-wearable watch device, a mobile communication terminal, a smart phone, a notepad, a tablet computer, etc. The user device 100 includes an environment sensor unit 102, a wireless communication unit 104, and a processing unit 106.

The environment sensor unit 102 includes one or more environment sensors, and obtains environment data in the space where a user is located. The environment sensors may include any sensors that are capable of obtaining environment information such as space feature information including one or more of a temperature, humidity, intensity of illumination, noise, and the like in the space. The wireless communication unit 104, which may be implemented with a network interface device, communicates with the relay fixing device 110 and/or the base fixing device 120, and obtains an RSSI for the relay fixing device 110 or base fixing device 120 in the vicinity of to the user device 100, in a wireless network environment. The wireless network environment, for example, may be WSN (Wireless Sensor Network) environment. Physical network environment for the WSN, for example, may be a wireless network technology such as ZigBee. Further, the wireless network technology may include Bluetooth, Wi-Fi (Wireless-Fidelity), and IrDA (Infrared Data Association) for PAN (Personal Area Network). Furthermore, the wireless network environment may be mobile communication technologies such as CDMA (Code Division Multiple Access), WCDMA (Wireless Code Division Multiple Access, and LTE (Long Term Evolution); and wireless communication technologies such as WiMAX (World Interoperability for Microwave Access) and WiBro (Wireless Broadband).

The processing unit 106 controls the wireless communication unit 104 and the environment sensor unit 102, extracts feature information of the space in which the user is located by using the RSSI and environment data that have been obtained, and recognizes space information by combining the obtained RSSI and environment data.

The relay fixing device 110 includes an environment sensor unit 112, a wireless communication unit 114, and a processing unit 116. The environment sensor unit 112 includes one or more environment sensors that are substantially identical to the environment sensors included in the user device 100, and obtains environment data in a fixed space. The wireless communication unit 114, which may be implemented with a network interface device, communicates with the user device 100, another relay fixing device, and/or the base fixing device 120 in the wireless network environment. The processing unit 116 controls the environment sensor unit 112 and the wireless communication unit 114, and extracts feature information from the obtained environment data.

The base fixing device 120 includes an environment sensor unit 122, a wireless communication unit 124, and a processing unit 126. The environment sensor unit 122 includes one or more environment sensors that are substantially identical to the environment sensors included in the user device 100 or the relay fixing device 110, and obtains environment data in a fixed space. The wireless communication unit 124, which may be implemented with a network interface device, communicates with the user device 100, the relay fixing device, and/or another base fixing device, and transmits/receives information in operational connection with the server, in the wireless network environment. The processing unit 126 controls the environment sensor unit 122 and the wireless communication unit 124, and extracts feature information from the obtained environment data.

Meanwhile, the server may be separately installed in the space recognition system, or any one of the base fixing devices 120 may perform the function of the server. The server may perform wireless communication with the user device 100, the relay fixing device 110, and the base fixing device 120. Further, the server may receive environment pattern information that is periodically transmitted by the user device 100 and the relay fixing device 110, and transmits the received environment pattern information to the user device 100 when there is a request of the user device 100. Moreover, the server may receive environment pattern information obtained by the user device and one or more relay or base candidate fixing device to be subjected to the space recognition, and determines space information by performing a combination and recognition function on the basis of the environment pattern information.

Figure 2:
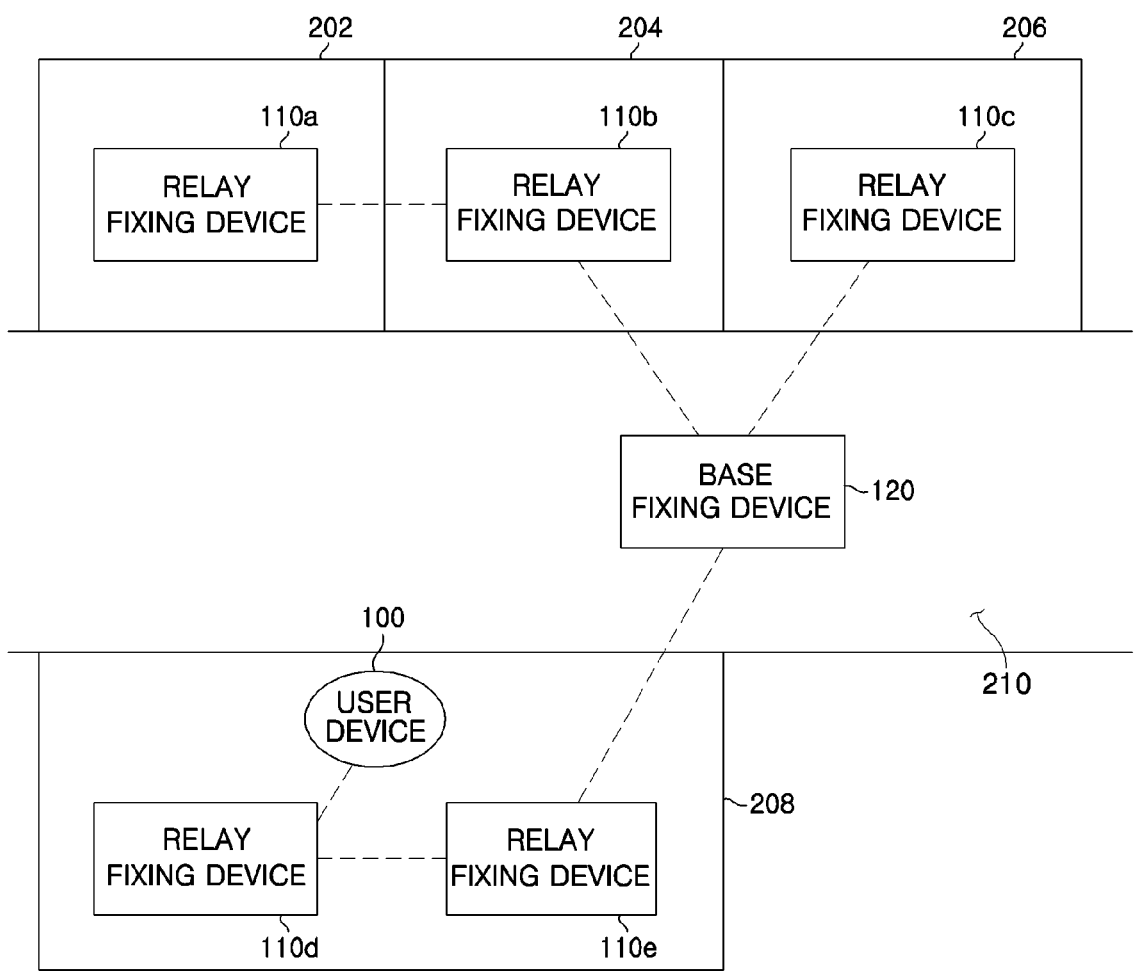
FIG. 2 is an arrangement of components in the space recognition system based on environment information in indoor environment in accordance with an embodiment of the present invention.

FIG. 2 is an arrangement of components in the space recognition system based on environment information in indoor environment in accordance with an embodiment of the present invention.

As illustrated in FIG. 2, the user device 100, the relay fixing device 110 and the base fixing device 120 may exist as one or in plurality in the indoor environment subjected to the recognition. In FIG. 2, there is illustrated that a plurality of relay fixing devices 110a, 11b, 110c, 110d and 110e is disposed in spaces 202, 204, 206, and 208, respectively and one base fixing device 120 is disposed in a space 210.

Generally, each of the relay fixing devices 110a to 110e may be disposed in each separate space 202 to 208, respectively, and one base fixing device 120 may be disposed in the space 210 to operationally link with the relay fixing devices 110a to 110e.

The user device 100 moves in the space 208 where it is located, and environment data and RSSI data are collected in the position of a user having the user device 100. Also, the user device 100 is wirelessly connected to the base fixing device 120 or any one of the relay fixing devices 110a to 110e in the vicinity of the user device 100, and communicates with the base fixing device 120 or the relay fixing device.

Figure 3A:
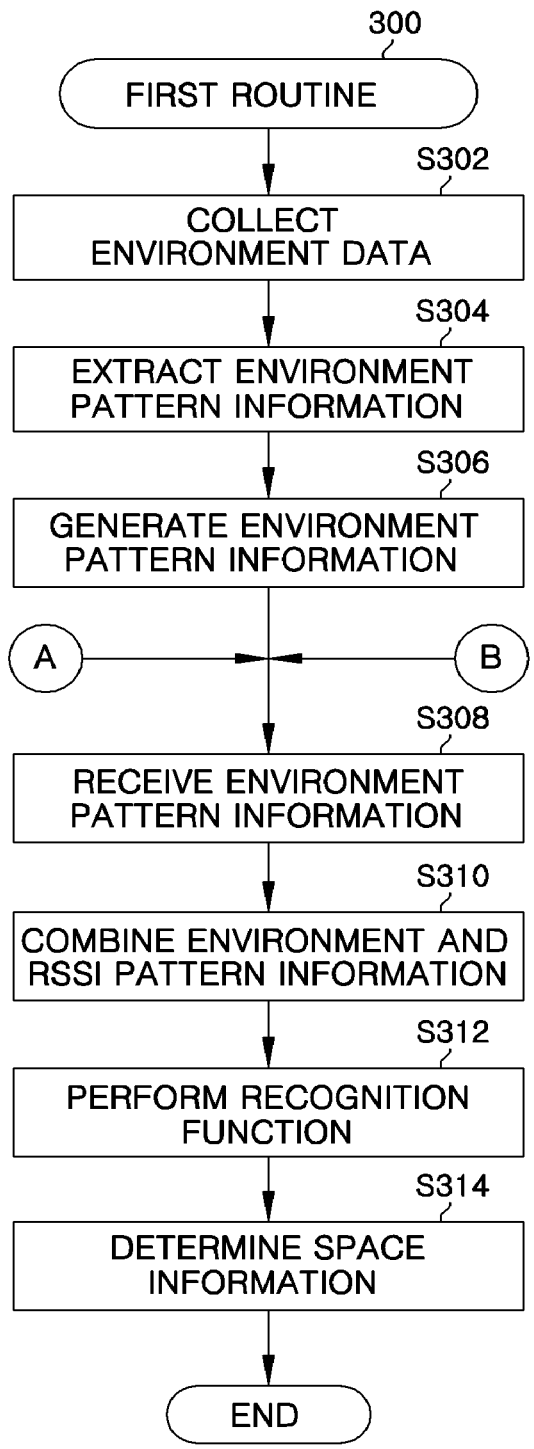
FIGS. 3A, 3B and 3C are flowcharts illustrating a method which is performed in the space recognition system based on environment information in accordance with an embodiment of the present invention.
Figure 3B:
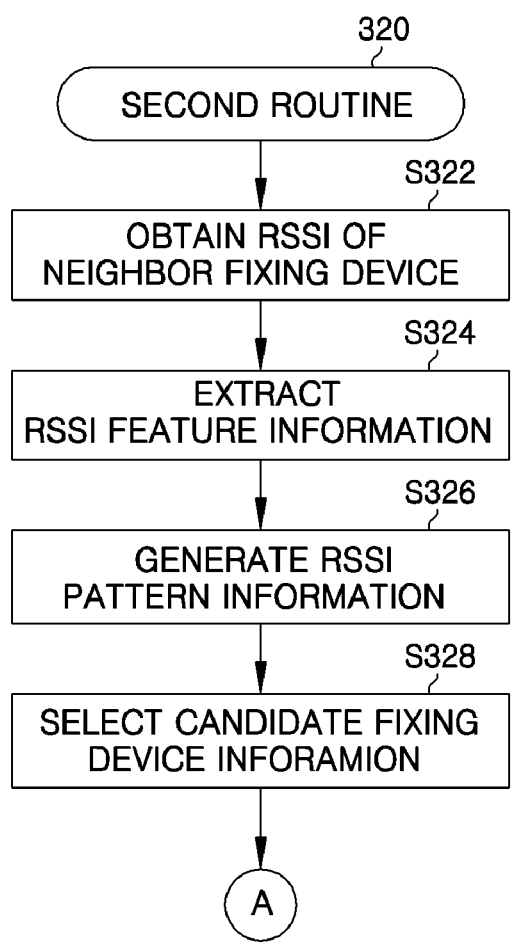
Figure 3C:
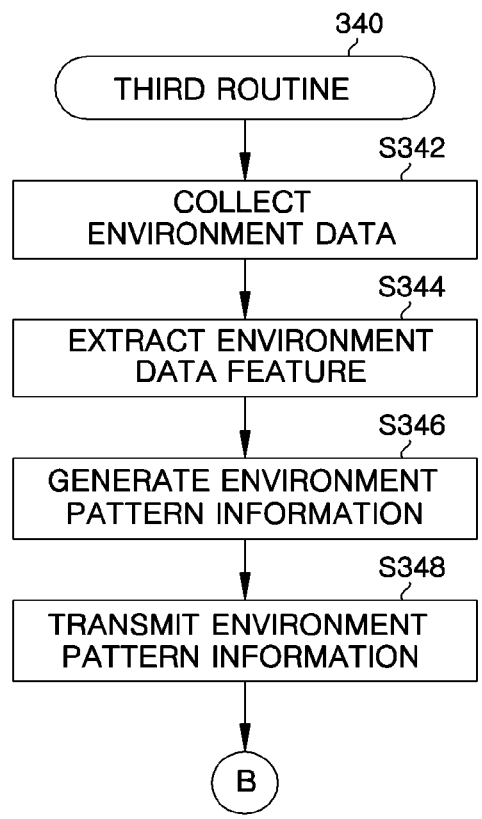

FIGS. 3A, 3B and 3C are flowcharts illustrating a method which is performed in the space recognition system based on environment information in accordance with an embodiment of the present invention. In particular, FIGS. 3A and 3B illustrate separate first and second routines 300 and 320 performed by the user device 100 that is located in a specific space 208. The first routine 300 and the second routine 320 may simultaneously or sequentially performed by the user device 100. Further, FIG. 3C illustrates a third routine 340 performed by the relay and base fixing devices 110 and 120.

In the first routine 300 performed by the user device 100, first, the environment sensor unit 102 collects environment data in the space 208 according to control by the processing unit 106 in operation S302. The processing unit 106 extracts feature information from the collected environment data in operation S304, and generates pattern information on the environment information on the basis of the extracted feature information in operation S306.

Here, the feature information is a factor necessary for analyzing the features of the environment data and is extracted by a signal processing technique or a pattern recognition technique which is well known in the art. The pattern information is generated in a type suitable for a recognition algorithm of the space recognition system based on environment information.

Meanwhile, in the second routine 320 performed by the user device 100, the environment sensor unit 102 obtains RSSIs for the relay and base fixing devices 110a to 11e and 120 in the vicinity of the user device 100 according to control by the processing unit 106 in operation 5322. The processing unit 106 extracts feature information from the obtained RSSIs in operation 5324, and generates RSSI pattern information on the basis of the extracted feature information in operation 5326. In this regard, the feature information is extracted by the signal processing technique or the pattern recognition technique, or is used by simply normalizing an RSSI value.

The processing unit 106 selects one or more candidate fixing devices that are installed in their respective spaces subjected to the space recognition in operation 5328. In this regard, the number of neighbor fixing devices subjected to the extraction of RSSIs is set as one or more, the maximum number of the fixing devices that become candidate fixing devices is predetermined, and the number of candidate fixing devices is determined within a maximum of number range. In the second routine 320, when the number of neighbor fixing devices for obtaining an RSSIs is less than a maximum of number, all neighbor fixing devices from which RSSIs have been respectively obtained are determined as candidate fixing devices. Information on the candidate fixing device(s) is then provided to the user device 110 through a tab 'A'

Meanwhile, in the third routine 340, the relay fixing devices 110a to 110e and the base fixing device 120 related with the user device 100 also collects environment data in their corresponding spaces 202 to 208 and 210 by using their corresponding environment sensors in operation 5342, and extracts feature information from the collected environment data in operation 5344, in the same method as that of the user device 100.

Each of the fixing devices generates pattern information on environment information on the basis of the extracted feature information in operation 5346, and transmits the generated environment pattern information to the user device 100 through a tab 'B' in operation 5348. In this case, a time for transmitting the environment pattern information is predetermined in accordance with a predetermined policy. Alternatively, the environment pattern information may be periodically transmitted to and stored in a separate server, or the environment pattern information may be transmitted only when there is a request.

Referring again to the first routine 300 performed by the user device 100, the user device 100 receives information about the selected candidate fixing devices, and requests the environment pattern information from the candidate fixing devices to obtain the environment pattern information in operation 5308. In this case, the user device 100 may use the environment pattern information that has been stored in a separate server according to a predetermined policy, or request the environment pattern information from the candidate fixing devices to obtain the environment pattern information.

Subsequently, the user device 100 combines the environment pattern information generated by the user device 100 and the environment pattern information and RSSI pattern information obtained from the candidate fixing devices in operation 5310, and performs a recognition function on the combined pattern information by using a recognition algorithm in operation 5312.

Thereafter, the user device 100 selects one of the candidate fixing devices having the highest result value to determine the space, in which the candidate fixing device having the highest result value is installed, as an estimated space in which the user is estimated to be located according to the result of the performed recognition function, in operation 5314. In the process that is performed in the first routine 300 of the user device 100, it should be understood that any one of a plurality of base fixing devices may be used as a server, or a separate server may be used in operational connection with one base fixing device. For example, a server may be configured to receive and process environment pattern information and RSSI information obtained by the user device and the candidate fixing device(s), thus minimizing a processing process in the user device.

Figure 4:
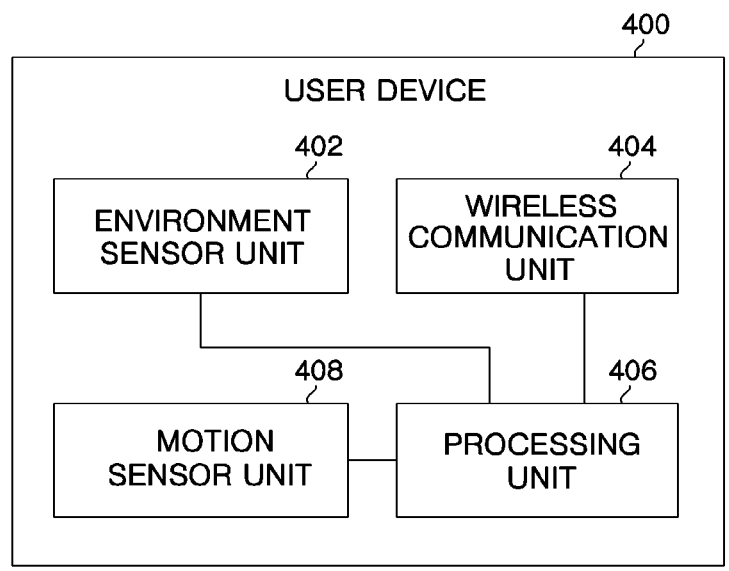
FIG. 4 is a detailed block diagram illustrating a structure of the user device shown in FIG. 1.

FIG. 4 is a block diagram of a user device in accordance with another embodiment of the present invention.

As illustrated in FIG. 4, similarly to the embodiment of FIG. 1, a user device 400 includes an environment sensor unit 402, a wireless communication unit 404, a processing unit 406, and a motion sensor unit 408. In other words, except that the user device 400 further includes the motion sensor unit 408, the user device 400 is substantially identical to the user device 100 of FIG. 1. Therefore, a repetitive description on the same components is not provided.

The motion sensor unit 408 includes one or more motion sensors, and obtains motion data based on a user's motion. The motion sensor may be configured by combining two or more inertial sensors such as an accelerometer sensor, a gyroscope sensor, and a geomagnetic sensor. The motion sensor obtains information on a motion, posture, and direction of the user device 400 from an extracted motion sensing signal.

Figure 5:
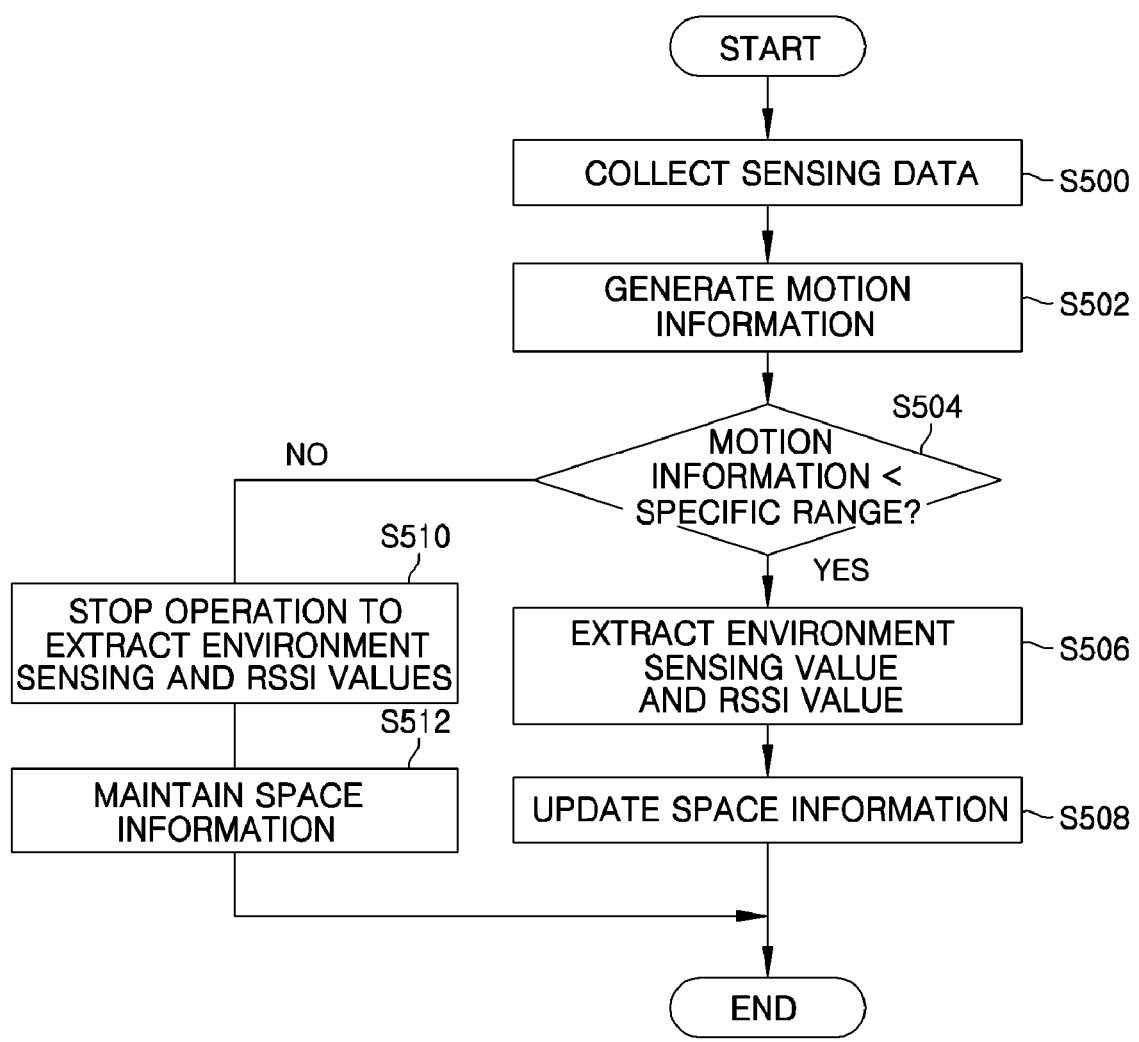
FIG. 5 is a flowchart illustrating an operation procedure of a user device shown in FIG. 4.

FIG. 5 is a flowchart illustrating an operation of a user device in accordance with another embodiment of the present invention.

Referring to FIG. 5, in the space recognition system based on environment information, the motion sensor unit 408 of the user device 400 collects motion sensing data such as the acceleration, angular speed, and geomagnetism of the user device 400 from the motion sensor unit 408 in operation S500, and generates motion information including a motion, a posture, and a direction using the collected motion sensing data in operation S502.

The motion sensor unit 408 transfers the extracted motion information to the processing unit 406. The processing unit 406 determines whether the motion information is within a specific range in operation S504. When it is determined in operation S504 that the motion information is not within the specific range, the user device 400 extracts space information including an environment sensing value and an RSSI value, which is newly obtained from a space where the user is located, in operation S506, and updates an existing space information as the newly obtained space information of the user device 400 in operation S508.

However, when it is determined in operation S504 that the motion information exceeds the specific range, the user device 400 does not extract the environment sensing value and the RSSI value in operation S510. In this connection, the specific range may be predetermined according to a policy for the control of the user device 400. The existing space information is maintained as the current space information of the user device 400.

That is, when the motion information obtained from the user device 400 exceeds the specific range, the processing unit 406 performs a control such that the environment sensor unit 402 and the wireless communication unit 404 are not driven, thus reducing the power consumption in the user device 400.

Moreover, when the operation of extracting the environment sensing value and the RSSI value is not performed, the existing space information in which a user wearing or having the user device 400 is located is maintained as previously recognized space information, and only when the motion information obtained from the user device 400 is not within the specific range, the existing space information will be updated.

Moreover, by using a topology map including path information enabling the moving of a user, an inter-space moving path of the user wearing or having the user device 400 may also be estimated.

According to the embodiments of the present invention, the space recognition method and system based on environment information may more accurately and efficiently recognize a space in which a user necessary for providing the position-based service is located.

Accordingly, the space recognition system based on environment information of the embodiments may be applied in an indoor environment inside a building, and may be usefully used to provide a service necessary for a user by recognizing a space in which the user is located in a building or trace the position of a user when the user is under an emergency situation in a space in a building. Also, the space recognition system of the embodiments enables the provision of a robot service to a user in an indoor space, and thus contributes to form the market for the related art.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A method of recognizing a space in which a user having a user device is located in an indoor environment having a wireless sensor network, the method comprising:
    obtaining available RSSI (Received Signal Strength Indicator) information for a plurality of fixing devices in the vicinity of the user device in the wireless sensor network environment;
    collecting environment information in the space;
    collecting environment information in a plurality of spaces in which the fixing devices are respectively located;
    combining the RSSI information and the environment information collected in the space and the environment information collected from the fixing devices;
    collecting motion information in the space in which the user is located; generating the motion information, which includes at least one of a motion, posture, and direction of the user device, on the basis of the motion information;
    determining whether the motion information is within a predetermined range;
    performing said collecting the environment information and said obtaining the RSSI information when the motion information is below the predetermined range;
    maintaining information on a previously recognized space when the motion information exceeds the predetermined range; and
    performing a recognition function on the combined environment information to recognize the space in which the user is located.

2. The method of claim 1, wherein said collecting environment information in the space comprises obtaining environment data including at least one of a temperature, humidity, intensity of illumination, and noise in the space.

3. The method of claim 1, wherein said collecting environment information in a plurality of spaces in which the fixing devices are respectively located comprises:
    obtaining, by the neighbor fixing devices, environment data in the respective spaces in which the neighbor fixing devices are located;
    extracting, by the neighbor fixing devices, feature information from the obtained environment data;
    generating, by the neighbor fixing devices, environment pattern information on the basis of the extracted feature information; and
    transmitting, by the neighbor fixing devices, the generated pattern information to the user device.

4. The method of claim 1, wherein said collecting environment information in the space comprises:
    extracting feature information from the collected environment information; and
    generating environment pattern information on the basis of the extracted feature information.

5. The method of claim 1, wherein said obtaining available RSSI information for a plurality of fixing devices in the vicinity of the user device comprises:
    extracting feature information from the obtained RSSI information; and
    generating pattern information on the RSSI information on the basis of the extracted feature information.

6. The method of claim 5, further comprising determining a predetermined number of candidate fixing devices from among the plurality of neighbor fixing devices from which the RSSI information has been obtained.

7. The method of claim 6, wherein said combining the RSSI information and the environment information comprises:
    combining the environment pattern information and the RSSI pattern information collected from the candidate fixing devices; and
    wherein said performing a recognition function on the combined environment information comprises:
    performing a recognition function on the combined pattern information; selecting one of the fixing devices having an highest result value; and
    determining a space, in which the selected fixing device is located, as the space in which the user is located.

8. A user device for recognizing a space where the user device is located, comprising:
    a wireless communication unit configured to obtain RSSI (Received Signal Strength Indicator) information for a plurality of fixing devices in the vicinity of the user device, and receive environment information obtained from the neighbor fixing devices;
    an environment sensor unit configured to collect environment information in the space;
    a motion sensor unit, the motion sensor unit includes at least one inertia sensor configured to collect motion information in the space in which the user is located, and extract the motion information including at least one of a motion, posture, and direction of the user device on the basis of the motion information;
    a processing unit configured to:
    determine whether the motion information is within a predetermined range, perform collecting the environment information and obtaining the RSSI information when the motion information is below the predetermined range,
    maintain information on a previously recognized space when the motion information exceeds the predetermined range, and perform a recognition function on the RSSI information and environment information to recognize position information on the space.

9. The user device of claim 8, wherein the environment sensor unit obtains environment data including at least one of a temperature, humidity, intensity of illumination, and noise in the space.

10. The user device of claim 8, wherein the wireless communication unit configured to obtain the environment data from the environment sensor unit, extract feature information from the obtained environment data, generate pattern information on environment information on the basis of the extracted feature information, and transmit the generated pattern information to the user device.

11. The user device of claim 8, wherein the processing unit is further configured to extract feature information from the collected environment information, and generate pattern information on environment information on the basis of the extracted feature information.

12. The user device of claim 8, wherein the processing unit is further configured to extract feature information from the obtained RSSI information, and generate pattern information on the RSSIs on the basis of the extracted feature information.

13. The user device of claim 8, wherein the processing unit is further configured to determine a predetermined number of candidate fixing devices from among the neighbor fixing devices from which the RSSI information has been obtained.

14. The user device of claim 13, wherein the processing unit is further configured to combine environment pattern information and RSSI pattern information obtained from the candidate fixing devices, perform a recognition function on the combined pattern information, select one of the fixing devices having an highest result value, and determine a space, in which the selected fixing device is located, as the space in which the user is located.

15. A system for recognizing a space in which a user is located, comprising:
   one or more relay fixing devices, wherein each relay fixing devices is configured to obtain environment information in a fixed space in which the relay fixing devices is installed;
   a base fixing device configured to perform wireless communication with the relay fixing devices to receive the environment information from the relay fixing devices;
   a user device belong to the user, wherein the user device is configured to:
      perform wireless communication with the relay and base fixing devices,
      collect the environment information from the relay and base fixing devices,
      checking RSSI (Received Signal Strength Indicator) information of the relay fixing devices and base fixing device to determine one or more candidate fixing devices,
      collect environment information from the candidate fixing devices,
      collect motion information in the space in which the user is located;
      generate the motion information, which includes at least one of a motion, posture,
      and direction of the user device, on the basis of the motion information;
      determine whether the motion information is within a predetermined range;
      perform said collecting the environment information and said obtaining the RSSI information when the motion information is below the predetermined range;
      maintain information on a previously recognized space when the motion information exceeds the predetermined range; and
   perform a recognition function on the environment information and the RSSI information to recognize the space in which a user is located.

16. The space recognition system of claim 15, wherein the base fixing device is further configured to store the environment information from the relay fixing device, and transmit the environment information to the user device in response to a request of the user device; and
   the base fixing device is further configured to combine the environment information from the relay fixing device and the RSSI information from the user device and perform a recognition function on the combined information to determine a space, in which a fixing device having an highest result value is located, as an estimated space in which the user is located.

* * * * *